(12) United States Patent
O'Brien et al.

(10) Patent No.: US 10,435,143 B1
(45) Date of Patent: Oct. 8, 2019

(54) UNMANNED AERIAL VEHICLE WITH PORTS CONFIGURED TO RECEIVE SWAPPABLE COMPONENTS

(71) Applicant: Amazon Technologies, Inc., Seattle, WA (US)

(72) Inventors: Barry James O'Brien, Seattle, WA (US); Joshua John Watson, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 15/415,697

(22) Filed: Jan. 25, 2017

(51) Int. Cl.
| B64C 27/08 | (2006.01) |
| B64C 1/06 | (2006.01) |
| B64C 1/22 | (2006.01) |
| B64D 47/08 | (2006.01) |
| B64D 9/00 | (2006.01) |
| B64D 45/04 | (2006.01) |

(52) U.S. Cl.
CPC .............. *B64C 27/08* (2013.01); *B64C 1/068* (2013.01); *B64C 1/22* (2013.01); *B64D 47/08* (2013.01); *B64C 2201/024* (2013.01); *B64C 2201/042* (2013.01); *B64C 2201/108* (2013.01); *B64C 2201/126* (2013.01); *B64C 2201/145* (2013.01); *B64D 9/00* (2013.01); *B64D 45/04* (2013.01)

(58) Field of Classification Search
CPC .......... B64C 2201/00; B64C 2201/021; B64C 2201/027; B64C 2201/042; B64C 2201/123; B64C 2201/121; B64C 2201/126; B64C 2201/127; B64C 2201/128
See application file for complete search history.

(56) References Cited

U.S. PATENT DOCUMENTS

| 10,099,784 | B1* | 10/2018 | Nilson | B64C 39/024 |
| 2013/0287577 | A1* | 10/2013 | Lin | B64C 11/04 |
| | | | | 416/210 R |
| 2016/0137306 | A1* | 5/2016 | Ji | B64C 27/08 |
| | | | | 244/54 |
| 2016/0332747 | A1* | 11/2016 | Bradlow | B64D 47/08 |
| 2017/0015418 | A1* | 1/2017 | Matus | B64C 39/024 |
| 2017/0217599 | A1* | 8/2017 | Peng | B64C 25/08 |

* cited by examiner

*Primary Examiner* — Richard G Davis
(74) *Attorney, Agent, or Firm* — Lee & Hayes, P.C.

(57) ABSTRACT

A configurable unmanned aerial vehicle (UAV) may include swappable components that may be selectable to configure a customized UAV just prior to deployment of the UAV that is configured to deliver a package to a destination. The UAV may include a plurality of ports that may accept swappable components. The ports may be coupled to a logic board to enable control of the swappable components. The ports and swappable components may enable quick replacement of a malfunctioning components, such as an image sensor, which may avoid subjecting a UAV to significant downtime for service. The malfunctioning component may then be serviced after the UAV is readied for a subsequent flight or deployed on a subsequent flight.

17 Claims, 10 Drawing Sheets

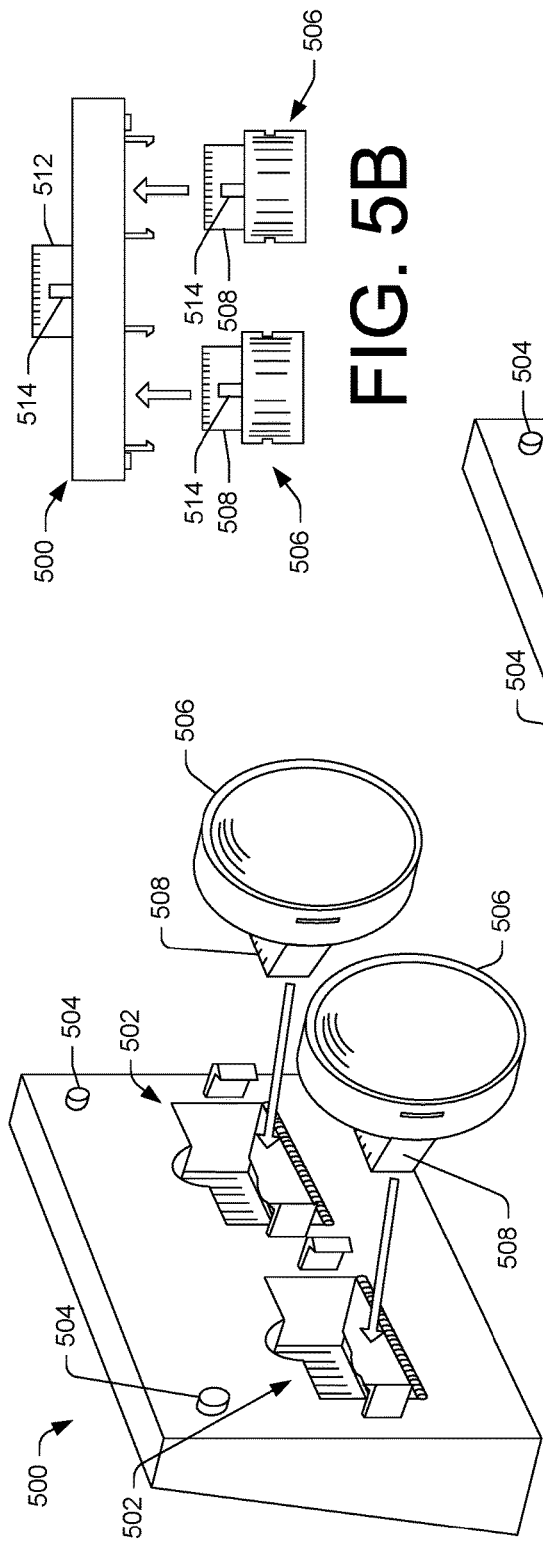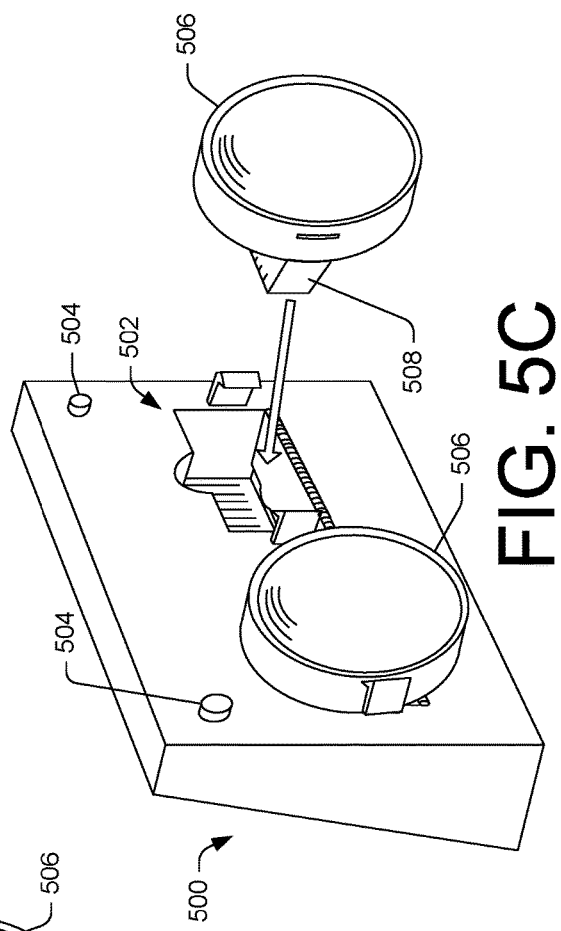

UNMANNED AERIAL VEHICLE WITH PORTS CONFIGURED TO RECEIVE SWAPPABLE COMPONENTS

BACKGROUND

Many aircraft include many sensors, processors, software, electronics, and other components to enable successful control of the aircraft and enable the aircraft to perform specific functions, such as transport objects. Typically, sensors are hardwired in aircraft and directly interface with avionics and electronic systems of the aircraft. When a sensor malfunctions, the aircraft is typically decommissioned for a period of time while the sensor is replaced or repaired. Downtime of aircraft can be expensive and can result in a poor customer experience when the downtime leads to delays that impact customers.

Unmanned aerial vehicles (UAVs) may use many different sensors depending on an intended use of the UAVs. For example, to perform a specific task, a fleet manager may select a particular UAV that is ideal to perform this task while considering different sensor configurations of UAV available to the fleet manager. To enable use of an optimized UAV, the fleet manager must have multiple different UAVs available from which to select. This may require a large fleet of UAVs, which may be cost prohibitive to some organizations.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 5A-5C show an intermediate logic board that accepts swappable components and is configured to couple into a port in of the UAV. FIGS. 5A and 5C are perspective views while FIG. 5B is a top view.

DETAILED DESCRIPTION

Figure 1:
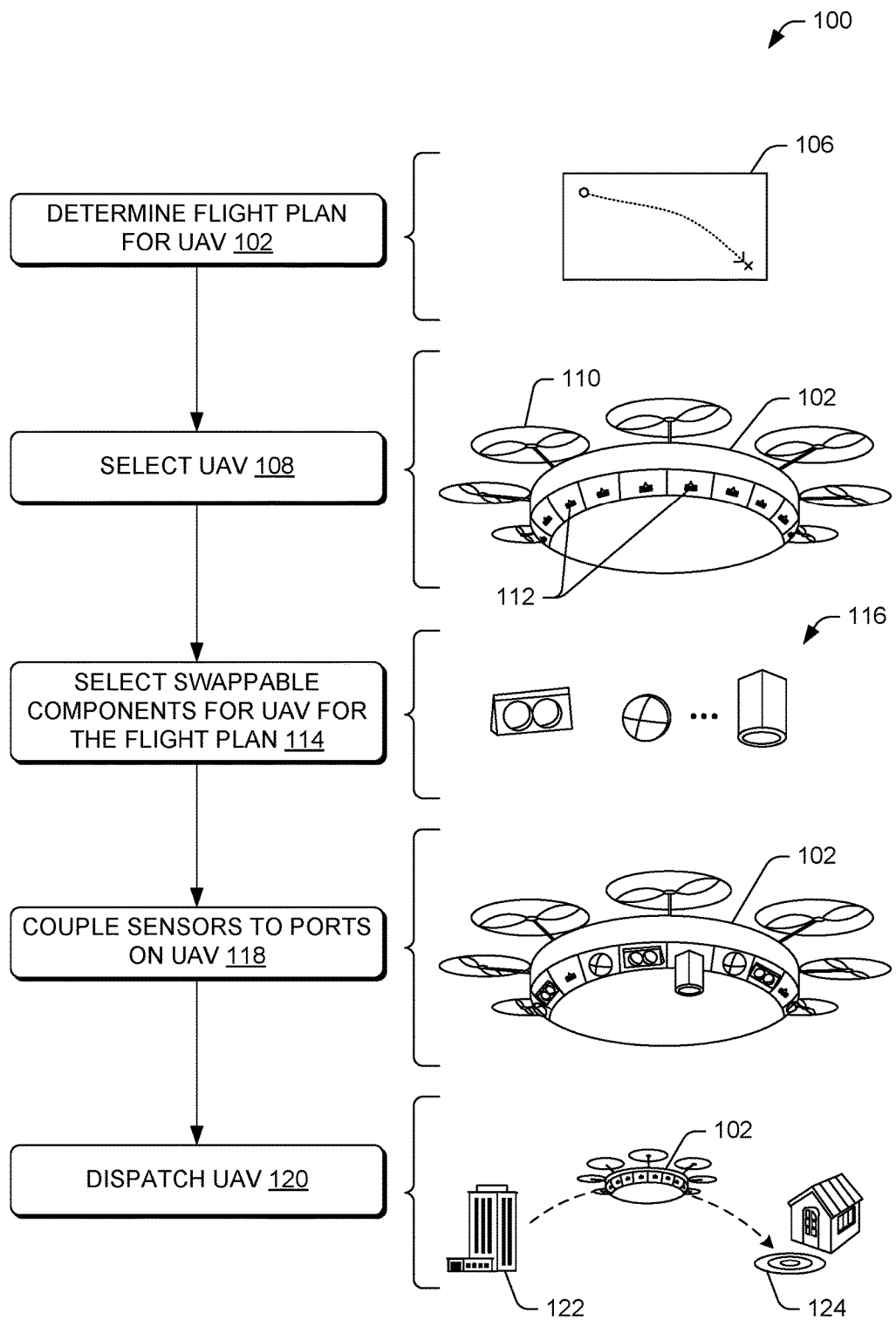
FIG. 1 is a pictorial flow diagram of an illustrative process to configure an unmanned aerial vehicle (UAV) with illustrative swappable components prior to flight of the UAV.

This disclosure is directed to an unmanned aerial vehicle (UAV) configured with ports configured to receive swappable components that may be selectable for use for a specific operation and to build a customized UAV, such as to execute a specific flight plan to deliver a package to a destination. For example, the UAV may be custom configured just before a flight by selecting appropriate components for a flight plan to be executed by the UAV. Various factors may be involved in the selection of the components, such as an availability of different components, environmental conditions along an anticipated route of flight, a region of use of the UAV, compatibility, a distance of the flight, power considerations, security considerations, malfunction of components on a UAV, and/or other factors. In some embodiments, the ports and swappable components may enable quick replacement of a malfunctioning component, such as an image sensor, which may avoid subjecting a UAV to significant downtime for service. The malfunctioning component may then be serviced after the UAV is readied for a subsequent flight or deployed on a subsequent flight.

The UAV may include a number of ports that may be accessible about a housing of the UAV. For example, ports may be arranged around a perimeter of a housing of the UAV. The ports may include data connectivity and/or access to power supplied by a power source, such as a battery. The ports may include or be located adjacent to a component constraint device that selectively secures or couples the component in the port. In some embodiments, the component constraint device may be operable by a controller of the UAV, such as to enable ejecting a malfunctioning component or ejecting a component that is not selected for use in a subsequent flight.

The swappable components may include virtually any type of sensor and/or add-on object that can be used by the UAV to assist with a flight or to assist with another operation performed by the UAV. Components may or may not require data connectivity and/or may or may not draw power from a battery of the UAV via the ports. The components may include a coupling mechanism, such as a plug or other feature to couple to the UAV, or to be coupled to by the UAV. Example components may include different imaging devices (e.g., cameras, stereo cameras, LIDAR sensors, time-of-flight sensors, infrared sensors, etc.), communication devices, lights, speakers, power sources (e.g., batteries, power generation devices, etc.), robotic arms and/or other engagement mechanisms, and/or weights to modify a center of mass of the UAV. Many other types of components may also be used with the UAV that is configured with the ports to receive swappable components. In some embodiments, the ports may have a generic or standardized design and may be used for many different components. However, the ports may have different design profiles, which may accept some components and may not accept other components. For example, some ports may be intended for use by image sensors and may include a port design that accommodates image sensors and does not accommodate (e.g., does not couple to) at least some other components.

The components may be selected for a flight plan at a fulfillment center just prior to deploying the UAV. For example, the components may be selected based on a receipt of an order of an item or request for a delivery of an item. The UAV may be assembled or configured with the components at the fulfillment center, and then deployed to deliver the item or items to one or more destinations before returning to the fulfillment center (or another location) to await redeployment, possibly in a different configuration and/or using different components.

The apparatuses, systems, and techniques described herein may be implemented in a number of ways. Example implementations are provided below with reference to the following figures.

FIG. 1 is a pictorial flow diagram of an illustrative process 100 to configure a UAV 102 with illustrative swappable components prior to flight of the UAV 102. The UAV 102 may be configured with a plurality of ports that accept swappable components to be coupled to the UAV, at least in part by the port. The port may be a cavity that accepts a connector, such as a plug from a component. However, the port may be a connector (e.g., plug) that may insert into a cavity on a component. For discussion purposes, the ports are primarily discussed and shown as having a cavity, but only for consistency of illustration and discussion. However, embodiments may include ports that are cavities, ports that have connectors (e.g., plugs) or other extruding matter, or a combination of both. The process 100 may be performed at a fulfillment center that receives orders of items and dispatches UAVs to deliver the items to destinations associated with specific orders.

At 104, a flight plan 106 of a UAV may be determined. For example, the flight plan 106 may be used to guide a UAV from a fulfillment center to a delivery destination, such as a residence of a customer. The flight plan 106 may be determined in response to an order of an item to be fulfilled by delivery via the UAV. The flight plan 106 may include environmental factors, such as expected flight conditions (e.g., day, night, weather), aircraft parameters (e.g., requirements of aircraft such as distance, weight, payload, etc.), and/or other information relevant to navigating a UAV from the fulfillment center to a destination.

At 108, the UAV 102 may be selected from various available UAVs. For example, a particular model or design of UAV may be selected for use to transport an item to the destination. UAVs may include different sizes, having different ranges of travel and different payload capabilities. Some UAVs may be configured with wings to support efficient forward flight while other UAVs may be rotorcrafts and may rely on rotors 110 for lift. The UAVs may include ports 112 that are configured to couple to components, such as imaging devices, power sources, speakers, weights, and/or other components, which may be swappable between different UAVs and/or easily swappable to replace a malfunctioning component.

At 114, swappable components 116 may be selected for the UAV based at least partly on the flight plan. The swappable components 116 may also be selected in part based on the UAV 102 selected at the operation 108, which may determine a number of available ports for coupling the swappable components, a payload ability, and/or other factors used to determine the swappable components 116. In some embodiments, the UAV 102 may be configured with swappable components from a prior flight or use of the UAV. In such instances, at 114, swappable components may be selected to swap out currently coupled components on the UAV and/or to add to the existing collection of components coupled to the UAV if additional ports 112 are available for coupling additional swappable components.

At 118, the swappable components may be coupled to the UAV 102, such as by coupling an extruding feature into a cavity or vice versa. Other coupling features may be used as to secure components to the UAV 102, such as magnetic couplers, slots, hook and loop connectors, adhesives, threads, tie downs, elastic bands, and so forth. These couplers may be used in addition to a coupling formed by a data port and/or power port (or combined data/power port). In some embodiments, the swappable components may be coupled to the UAV 102 without use of tools, such as by snapping or otherwise moving a component against the UAV until the component is engaged and coupled to the UAV via coupling features that engage the swappable component and/or the UAV.

At 120, the UAV 102 may be dispatched from a fulfillment center 122 to execute the flight plan to deliver the item(s) to a destination 124 and/or to other destinations. In some embodiments, the process 100 may be performed along an assembly line or other sequenced operation to assemble the UAV just prior to dispatch of the UAV at the operation 120. Thus, the UAV 102 may be assembled using components on-hand at the fulfillment center, or other location, that can perform the flight plan. When not in use, the components may be stowed, under inspection, being calibrated, being charged, powered, serviced, and/or replenished, and/or otherwise maintained for an impending use.

Figure 2:
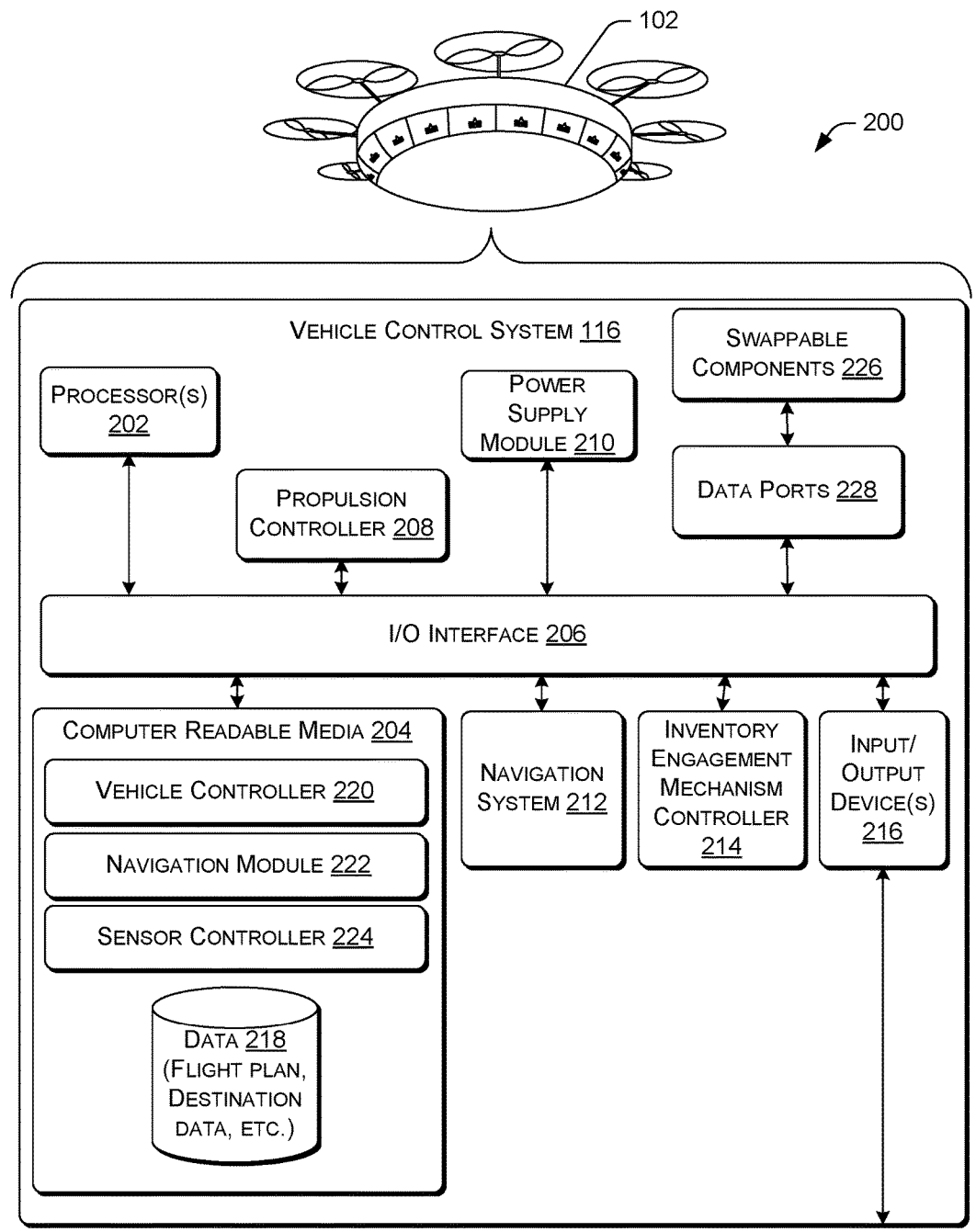
FIG. 2 is a block diagram of an illustrative architecture of a UAV configured with ports configured to receive swappable components.

FIG. 2 is a block diagram of an illustrative architecture 200 of a UAV configured with ports for swappable components. The architecture 200 may be used to implement the various systems, devices, and techniques discussed herein. In the example implementation, the architecture 200 includes one or more processors 202, coupled to a non-transitory computer readable media 204 via an input/output (I/O) interface 206. The architecture 200 may also include a propulsion controller 208 configured to control operation and output of a propulsion system. The architecture 200 may include a power supply module 210 configured to control operation of a power source (e.g., a battery or multiple batteries). The power supply module 210 may control the charging and any switching functions associated with the power supply of the UAV.

The architecture may include a navigation system 212. The propulsion controller 208 communicates with the navigation system 212 and adjusts the power of each propeller motor to guide the UAV along a determined flight path. The power supply module 210 may control the charging and any switching functions associated with one or more power modules (e.g., batteries) of the UAV. The navigation system 212 may include a GPS or other similar system that can be used to navigate the UAV to and/or from a location.

The architecture 200 may further include an inventory engagement mechanism controller 214 to interact with a container (e.g., cargo bay, item, or payload) and thereby secure, release, open, and/or close the container based on control logic. The inventory engagement mechanism controller 214 may communicate with an actuator(s) or motor(s) (e.g., a servo motor) used to engage and/or disengage inventory, such as via the container. For example, when the UAV 102 is positioned over or proximate to a delivery location, the inventory engagement mechanism controller 214 may provide an instruction to a motor that controls the inventory engagement mechanism to release an item from the container.

The architecture 200 also includes one or more input/output devices 216, such as, for example, one or more displays, accelerometers, gyroscopes, pressure sensors, weather sensors, gimbals, landing gear, pitot tubes and/or other devices that may be used to assist operation of the UAV 102, and/or other input/output devices commonly used in aviation. Multiple input/output devices 216 may be present and controlled by the architecture 200.

In various implementations, the architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86,PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202, such as, for example, data 218. In various implementations, the non-transitory computer readable media 204 may be implemented using any suitable memory technology, such as static random access memory (SRAM), synchronous dynamic RAM (SDRAM), nonvolatile/flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 204 or the architecture 200. Generally speaking, a non-transitory, computer readable memory may include storage media or memory media such as flash memory (e.g., solid state memory), magnetic or optical media (e.g., disk) coupled to the architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link.

In one implementation, the I/O interface 206 may be configured to coordinate I/O traffic between the processor(s) 202, the non-transitory computer readable media 204, and any devices (external and/or internal) and/or sensors, or other interfaces, such as input/output devices 216. In some implementations, the I/O interface 206 may perform any necessary protocol, timing or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface 206, such as an interface to the non-transitory computer readable media 204 may be incorporated directly into the processor(s) 202.

In some embodiments, the computer readable media 204 may store various components such as a vehicle controller 220, a navigation module 222, and a sensor controller 224. The components may access and/or write data 218, which may include flight plan data, log data, destination data, image data, and object data, and so forth. The components are described in turn.

The vehicle controller 220 may control general operation of the UAV 102, such as to control vehicle attitude. The vehicle controller 220 may provide instructions to the various motors of the propulsion system (possibly by providing power at different power levels) to control the UAV 102, such as to maintain flight, turn, rotate, move in a particular direction and/or perform other typical flight operations including takeoff, landing, and hover flight (for rotor-craft). Thus, the vehicle controller 220 may provide instruction and/or power setting to sustain continued flight.

The navigation module 222, in concert with the navigation system 212, may provide instructions to the vehicle controller to cause the aircraft to execute a particular flight plan. The navigation module 222 may execute the flight plan such as by identifying waypoints using a global positioning system (GPS), using computer vision by identifying landmarks and/or other objects, and/or receiving controls to cause the aircraft to proceed along a given path. The navigation module 222 may also perform object avoidance, such as by leveraging computer vision information, transmissions from other objects, and/or other information to cause the vehicle controller to cause the aircraft to avoid obstacles, such as buildings, other aircraft, birds, antennas, wires/cables, and so forth.

The sensor controller 224 may identify swappable components 226 coupled to data ports 228 that interface with the I/O interface 206 (also referred to a logic board). The swappable components may be any of the components 116 that may be selectively coupled to the UAV 102 via the ports 112, as shown in FIG. 1. The sensor controller 224 may identify a specific swappable component based on a handshake or other data transmission received from a swappable component via one the data ports 228. In addition, the sensor controller 224 may determine a location of the swappable component 226 based on a known location of a data port having connectivity with the swappable component. As an example, the swappable component may be a stereo camera pair, which may be coupled to a first data port of the UAV 102. After coupling the stereo camera pair, the sensor controller 224 may identify availability of the stereo camera pair for use by the UAV, such as for use as an input to the navigation module 222. The sensor controller 224 may communicate with the stereo camera pair, and with other swappable components coupled to data ports, using standard communication protocols to extract data from these components and/or otherwise interact with components (e.g., turn them on/off, etc.). In some embodiments, swappable components may be coupled to the data ports but may not be data collection devices, such as lights or weights. However, these devices may communicate a component identifier to the sensor controller 224, which may enable control of the component and/or storage of information associated with use of the component at a particular data port. Thus, the sensor controller 224 may activate a light or send information about a weight to the vehicle controller to enable update of a center of mass of the UAV 102. The sensor controller 224 may include software drivers for at least some of the swappable components. Some swappable components may not have drivers, such as components that do not collect data. In some embodiments, the sensor controller 224 may perform at least some calibration of swappable components that are sensors. For example, the sensor controller 124 may transmit signals to various sensors to activate operations by the sensors, which may transmit information back to the sensor controller 224 for use in calibrating the sensors.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the architecture 200 is merely illustrative and is not intended to limit the scope of the present disclosure. In particular, the computing system and devices may include any combination of hardware or software that can perform the indicated functions, including computers, network devices, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the architecture 200 is discussed below.

Figure 3:
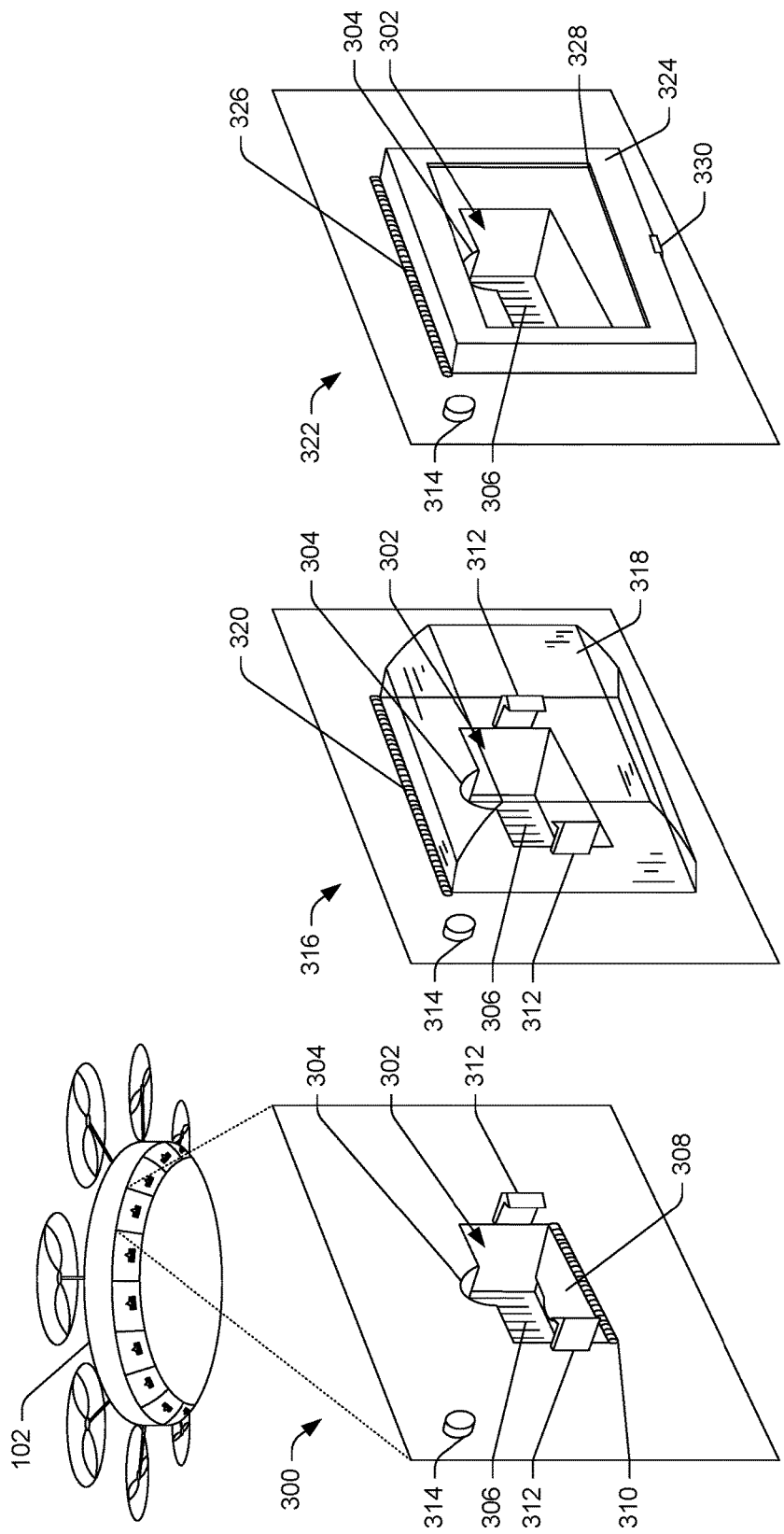
FIGS. 3A-3C are perspective views of detailed views of ports configured to receive swappable components.

FIGS. 3A-3C are perspective views of detailed views of ports configured to receive swappable components. FIG. 3A is a perspective view of a detail of an illustrative port 300 configured to couple to a swappable component, such as an image sensor. The port 300 may include a cavity 302 that may accept a correspondingly shaped plug from a swappable component. However, as discussed above, the port may be an extruded plug, or may have a generally planar surface. In some embodiments, the cavity may be formed similar to a standard connector shape, such as the shape of a standard universal serial bus (USB) connector.

The cavity 302 may include a directional feature 304, which may limit insertion of a corresponding plug or connector into the cavity in a particular orientation and direction. Thus, the directional feature 304 may cause the cavity to be non-symmetrical along at least one axis. In some embodiments, a controller may determine directionality of a component based on electronic signals received form a component through various pin connectors having known locations. For example, the controller may determine an orientation of a component disposed in a symmetrical cavity based on analysis of signals exchanged with the component, possibly based on which pin connectors receive the signals.

The port 300 may include connection points 306, such as pins or pinouts, that may enable transfer or data, power, or both via the various connection points. The connection points 306 may be located within the cavity 302 to protect the connection points 306 from possibly contamination or contact with other components. In some embodiments, the cavity 302 may include a door 308 or be located adjacent to the door, which may cover the cavity when the cavity 302 is not occupied by a plug or other connector of a swappable component. The door 308 may be coupled to the port 300 by a hinge 310 to enable the door to move between an open position that enables access to the cavity 302 and a closed position that prevents access to the cavity 302. As shown in FIG. 3A, the door is in the open position to reveal the cavity 302 of the port 300. However, in practice, the hinge 310 may bias the door 308 to the closed position when the cavity 302 is not occupied by a connector of a swappable component to cover the cavity 302. The door 308 may prevent dirt, water, and/or other objects from entering the cavity and contaminating the port 300 and/or interfering with the connection points 306.

In some embodiments, the port 300 may include one or more couplers 312, which may secure a swappable component to the port 300 until the coupler(s) 312 are released to enable removal of the swappable component. The couplers 312 may secure the swappable components in the port even when the swappable components are subject to vibration, airflow, and/or other forces present during flight of the UAV 102. Although the coupler(s) 312 are shown as projecting structures that physically engage a swappable component, other types of couplers may be used to secure the swappable components to the port 300. For example, the couplers 312 may be implemented as one or more of a magnet, adhesive surface, slots, hook and loop connectors, threads, tie downs, elastic bands, and/or other coupling features. In some embodiments, a release mechanism 314 or other device may activate a release of the swappable component from the coupler(s) 312. For example, the release mechanism 314 may include a mechanical connection, an electrical connection, or both, with the coupler(s) 312 to actuate the couples to release the swappable component from the port 300. The release mechanism 314 may release other coupler(s) 312 in other ways, such as be moving a magnet away from a swappable component to reduce magnetic force/attraction to decouple a swappable component. In some embodiments, the release mechanism 314 may be operable by a controller of the UAV, such as to enable ejecting a malfunctioning component or ejecting a device that is not selected for use in a subsequent flight.

FIG. 3B is a perspective view of a detail of another illustrative port 316 configured to couple to a swappable component. The port 316 may include some or all of the features described with reference to the port 300 shown in FIG. 3A. As shown in FIG. 3B, the port 316 does not include a door and/or hinge for the door. Instead, the port 316 includes a hood 318 the covers the port 316. The hood 318 may be coupled to the port 300 by a hinge 320 to enable the hood to move between an open position that enables access to the cavity 302 and a closed position that prevents access to the cavity 302. As shown in FIG. 3B, the hood is in the closed position to cover the cavity 302 of the port 316. The hood 318 may prevent dirt, water, or other objects from entering the cavity and contaminating the port 316 and/or interfering with the connection points 306. In various embodiments, the hood 318 may remain in an open position when a swappable component is coupled to the port. For example, the hood 318 may be opened to enable coupling the swappable component, and may not close until after remove of the swappable component at a later time. In some embodiments, unlike the door 308, the hood 318 may protect a swappable component from dirt, water, or other objects since the swappable component may reside under the hood 318 once coupled to the port 302 of the port 316, allowing the hood 318 to be in the closed position. The hood 318 may be formed of a clear or opaque material, such as plastic or glass which may enable image sensors (a possible swappable component) to capture imaging through the hood 318, which may include a planar outward-facing surface for such purposes. The hood 318 may provide additional utility to couple or restrain a swappable component to the port 316. The release mechanism 314 of the port 316 may release the coupler(s) 312, and in some instances, may release the hood 318 if the hood 318 is secured in the closed position by a coupling feature. In some embodiments, the hinge 320 may bias the hood 318 in the closed position. The hood 318 may include a gasket that interfaces between the hood and a surface of the UAV, such as a housing, to create a seal, such as to prevent water from entering an interior of the hood 318 when the hood is in the closed position.

FIG. 3C is a perspective view of a detail of yet another illustrative port 322 configured to couple to a swappable component. The port 322 may include some or all of the features described with reference to the port 300 shown in FIG. 3A. As shown in FIG. 3C, the port 322 does not include a door and/or hinge for the door. Instead, the port 322 includes a hood 324 the covers the port 322. The hood 324 may be coupled to the port 300 by a hinge 326 to enable the hood to move between an open position that enables access to the cavity 302 and a closed position that prevents access to the cavity 302. As shown in FIG. 3C, the hood is in the closed position to cover the cavity 302 of the port 322. The hood 324 may prevent dirt, water, or other objects from entering the cavity and contaminating the port 322 and/or interfering with the connection points 306. In addition, unlike the door 308, the hood 322 may protect at least part of a swappable component from dirt, water, or other objects since at least part of the swappable component may reside under the hood 322 once coupled to the port 302 of the port 322. The hood 324 may include an aperture 328 to enable at least part of a swappable component to project through a portion of the hood 324, such as a lens of a sensor that may project through the aperture 328 without interference from the hood 324. The aperture 328 may be lined with a gasket that seals against the swappable component, when coupled in the port 322. The hood 318 may provide additional utility to couple or restrain a swappable component to the port 322. The release mechanism 314 of the port 322 may release a coupler 330 to release the hood 324 if the hood 318 is secured in the closed position by a coupling feature. In some embodiments, the hinge 326 may bias the hood 322 in the closed position.

Figure 4:
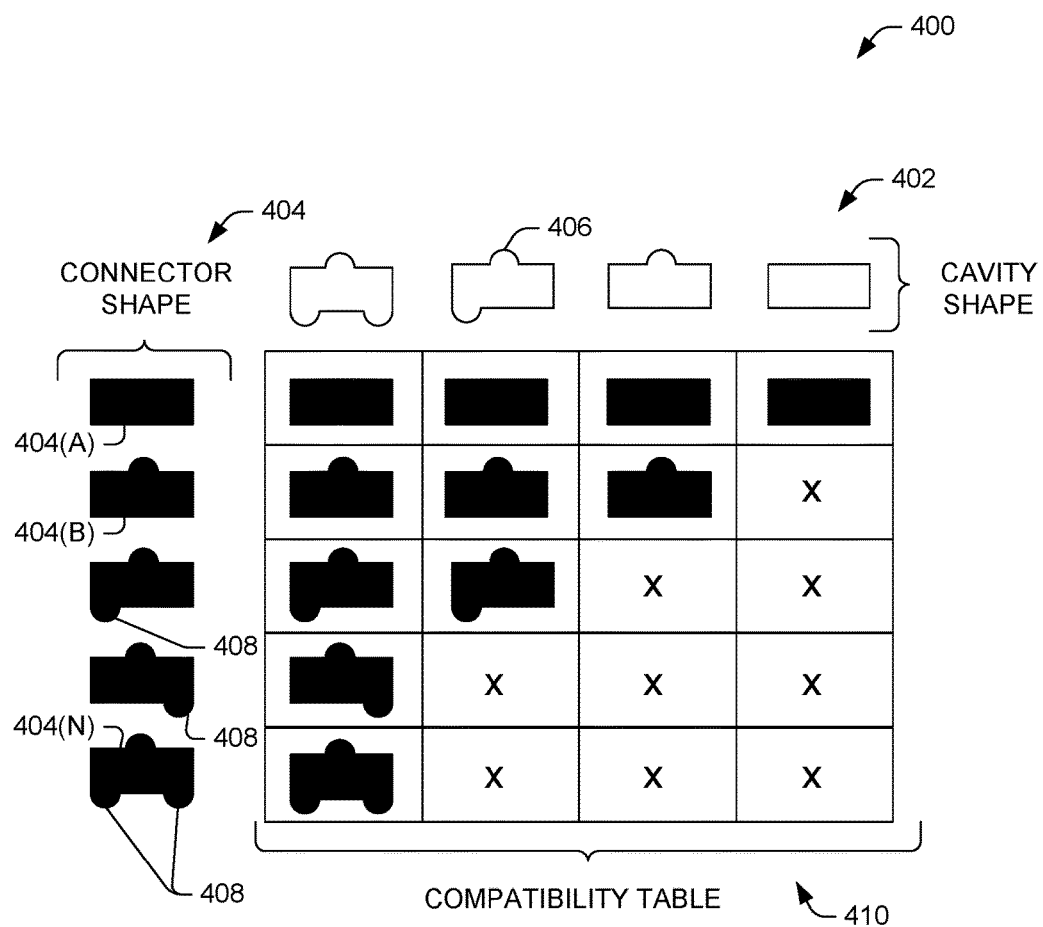
FIG. 4 shows a table of port shapes and corresponding compatible connector shapes.

FIG. 4 shows a table 400 of data port shapes and corresponding compatible component plug shapes. The table 400 includes possible cavity shapes 402, which may represent various designs of the cavity 302 shown in FIGS. 3A-3C or may represent cavities on the swappable components, in some embodiments. The table 400 shows possible connector shapes 404 which may couple to or be inserted into the cavity shapes 402. The cavity shapes may include one or more directional feature 406. The connector shapes 404 may include one or more limiting features 408 which may limit use of a connector with certain ones of cavity shapes. A compatibility grid 410 indicates which connector shapes may be inserted into or couple with which cavity shapes due to presence of the directional features 406 in the cavity shapes 402 and presence of the limiting features 408 in the connector shapes 404. For example, a first connector shape 404(A) may be formed in a generic shape used by a weight or other non-powered swappable component, and may fit in most or all cavity shapes. A second connector shape 404(B) may include a single limiting feature 408 that corresponds to a directional feature included in most, but not all cavity shapes, which may enable wide compatibility with most, but not all, cavity shapes. The second cavity shape 404(B) may be used for image sensors and other components that have a relatively high priority for ports and are designed to be placed in most ports. A last connector shape 404 (N) may include multiple limiting features 408 that correspond to specific directional features 406 of the cavity shapes, making this connector shape incompatible with many of the cavity shapes 402. The last connector shape 404(N) may be used for lights, communication devices, and other components that have a relatively low priority for ports and are designed to be restricted from some ports to free those ports for use with other, higher priority swappable components. In some embodiments, the limiting features and/or directional features may be associated with whether or not a swappable component uses power, uses data connectivity, or both.

FIG. 5A is a perspective view of an illustrative intermediate logic board 500 that accepts illustrative swappable components. The intermediate logic board is configured to couple to a port of the UAV 102. The intermediate logic board 500 may serve multiple purposes. For instance, the intermediate logic board may enable pairing multiple sensors together on the board and next to one another prior to receive of the UAV. This may enable at least some calibration to be performed prior to receipt of the UAV (e.g., while the UAV is flying back to the fulfillment center or at other times.). The intermediate logic board may also enable some coupling of components prior to access to the UAV, which in turn may shorten an amount of time to couple components to the UAV after receipt of the UAV since coupling to the UAV may include coupling groups of components via the intermediate logic boards rather than coupling each swappable component to the UAV separately. As another benefit, the intermediate logic board may be configured in different shapes and different numbers of ports, to enable connection of swappable components for specific purposes, such as for a stereo part to be directed or angled a certain way, for a time of flight sensor and light source to have a certain mounting direction, and so forth. Thus, the intermediate logic board may include different designs used to situation or orient one or more swappable components in a certain way.

The intermediate logic board 500 may include one or more port(s) 502 to couple to swappable components. The port(s) 502 may be configured similar to the any one of the ports shown in FIGS. 3A-3C and FIG. 4. The intermediate logic board 500 may include a release mechanism 504 to selectively eject or release a component from a port. In some embodiments, the release mechanism 504 may be operable by a controller of the UAV, such as to enable ejecting a malfunctioning component or ejecting a device that is not selected for use in a subsequent flight.

As shown in FIG. 5A, one or more swappable components 506 may be coupled to the ports by inserting a connector 508 of each of the swappable components 506 into respective ports. The swappable components 506 may engage and couple to the intermediate logic board 500, such as after coupling features secure or lock the swappable components to the intermediate logic board 500. The intermediate logic board 500 may include a profile shape 510, such as a wedge shape, or other profile shape that may cause the swappable components to be directed in a particular orientation.

FIG. 5B is a top plan view of the intermediate logic board 500 and the swappable components 506. As shown in FIG. 5B, the intermediate logic board 500 includes a connector 512 that may be coupled to a port on the UAV 102 shown in FIG. 1. The board connector 512 may be the same or similar to the connector 508 of the swappable components 506. As shown, the board connector 512 may include a limiting feature 514 configured to insert into the directionality feature of a port so that the swappable component has a known orientation when coupled to the UAV. Similarly, the connector 508 of the swappable components 506 may include the limiting feature 514.

FIG. 5C is a perspective view of the intermediate logic board 500 where one of the swappable components 506 is coupled to the intermediate logic board after installation of the swappable component. In some embodiments, an intermediate logic board may have more connectors than ports, which may enable supplying additional current to the ports on the intermediate logic board, such as when the ports on the UAV have limited power output.

Figure 6:
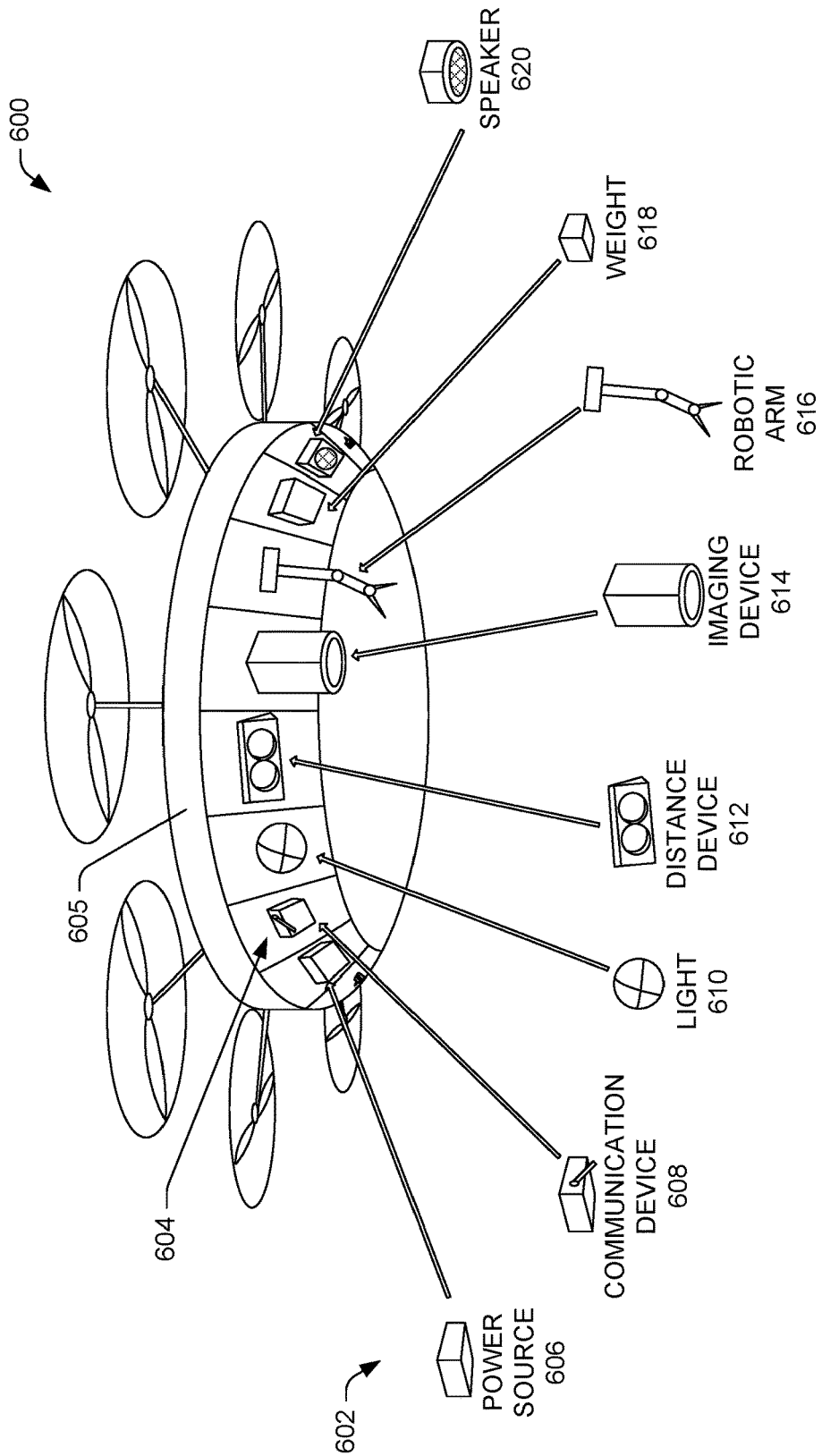
FIG. 6 shows a perspective view of an illustrative UAV with a plurality of different illustrative swappable components.

FIG. 6 shows a perspective view of an illustrative UAV 600 with a plurality of different illustrative swappable components 602. The UAV 600 may be the same or similar to the UAV 102 described with reference to FIG. 1.

As shown in FIG. 6, the UAV 600 may be configured with various different swappable components 602, which may couple to ports 604 located at various locations on the UAV 600 and/or on intermediate logic boards coupled to the UAV 600. Although the ports 604 are depicted in FIG. 6 as being aligned in a ring-like fashion about perimeter of a body 605 of the UAV 600, the ports may be located virtually anywhere on the UAV that allow coupling of a swappable component without interference with operations of the UAV. Various illustrative swappable components 602 are described below, which may be used independently or with other components on the UAV 600, such as to outfit or configure the UAV 600 to perform a specific task or to perform a flight plan having known attributes (e.g., weather, distance, payload, etc.). The illustrative swappable components 602 are shown both individually and coupled to the UAV 600. In many configurations, multiple of a same type of swappable component may be used by the UAV 600 for a flight, such as multiple image sensors situated about the UAV to provide computer vision at least partially around the UAV.

A power source 606 may be coupled to a port on the UAV 600 and may provide power to the UAV 600. The power source 606 may be an additional battery which may provide additional power to the UAV, such as to enable the UAV to sustain additional flight. In some embodiments, the power source 606 may be a solar panel or other renewable energy gathering device. The power source 606 may connect to power connection pins in the port to enable suppling of current to the UAV and/or to particular components of the UAV.

A communication device 608 may be coupled to a port on the UAV 600. The communication device 608 may be a radio or components used by a radio. For example, the communication device 608 may include an antenna, an amplifier, a transmitter, a receiver, and/or other components for communication. In some embodiments, the communication device 608 may enable a specific bandwidth of radio waves, such as a bandwidth used by devices along a flight path of the UAV 600. The communication device 608 may generate signals which are sent to the controller or other components of the UAV 600 via a port using a data connection and power connection.

A light 610 may be coupled to a port on the UAV 600 and may enable the UAV 600 to emit light. The light 610 may connect to a port on the UAV and may use power from a power source through connectivity to the port. In some embodiments, the light may be a light emitting diode (LED), a laser, an infrared light, and/or other types of lighting devices. The light may be used to measure distance, illuminate an object on the ground, reveal a location of the UAV 600, and/or may be used for other purposes.

A distance device 612 may be coupled to a port on the UAV 600 and may enable the UAV 600 to perform distance measurements, such as to measure a distance between the UAV and a delivery destination marker. The distance device 612 may be a stereo camera, a time-of-flight camera and light source, a sonar device, a LIDAR device, a radar device, or other distance measurement apparatus. In some embodiments, the distance device 612 may be coupled to an intermediate logic board, which in turn may be coupled to a port on the UAV 600.

An imaging device 614 may be coupled to a port on the UAV 600 and may enable the UAV 600 to capture imagery. The imaging device 614 may be part of the distance device (e.g., coupled to an intermediate logic board as part of the distance device, etc.) or may be independent from the distance device. The imaging device 614 may be a visible light camera, an infrared camera, or any other type of imaging device capable of generating signals representative of objects or conditions of which the imaging device is exposed. The imaging device 614 may generate signals which are sent to the controller or other components of the UAV 600 via a port using a data connection and power connection.

A robotic arm 616 may be coupled to a port on the UAV 600 and may enable the UAV 600 to grasp objects, possibly including a package. For example, a robotic arm 616 may be an actuated clamping mechanism that may selectively secure a package to the UAV 600, possibly a package suspended below the UAV during flight of the UAV. The robotic arm 616 may release the package, or another object, under control of the controller (or the inventory engagement mechanism controller 214 shown in FIG. 2), to cause the object to be placed at an intended location. In some embodiments, the robotic arm 616 may be controlled to move objects or take actions, possibly under control of a remote user or control center. In some embodiments, the robotic arm 616 may operate as landing gear or a landing platform to stabilize the UAV when the UAV is resting on the ground. The robotic arm 616 may include one or more joints, which may provide the robotic arm with a range of possible motions, such as to pivot or swivel, to extend or contract, and/or to otherwise move a distal end of the robotic arm 616 toward a specific position or location relative to the UAV 600. The robotic arm 616 may be controlled by the UAV 600 via a port using a data connection and power connection.

In some embodiments, a package may be coupled to the UAV via the port. For example, the package may include a connector that is engaged in a port, but is releasable by the UAV. The controller or inventory management mechanism may cause the connector to be ejected or otherwise released from the port at a certain time or in response to a trigger, resulting in release of the package from the UAV. For example, the UAV may release the package by releasing the connector from a port while at or over a delivery destination.

A weight 618 may be coupled to a port on the UAV 600 and may enable modifying a center of mass of the UAV 600 to "balance" the UAV. For example, after the UAV 600 is configured with various swappable components, and/or other objects, such as a payload, the center of mass of the UAV 600 may be determined. When the center of mass is substantially outside of a central axis of the UAV (e.g., axis extending vertically though the UAV when the UAV is in steady-state hover flight), then weights may be coupled to ports to cause the center of mass to be located closer to the central axis. By moving the center of mass closer to the central axis, the UAV 600 may apply a more balanced operation of propulsion units and may not have to overcome "tilting" forces caused by a non-central location of the center of mass of the UAV 600. The weights may come in different sizes and amounts, which may be specified for use in certain configurations to properly balance or weight the UAV to modify the center of mass. The weight 618 may be identifiable by the UAV via a data connection of a port, which may enable the UAV (or another device) to identify an amount and location of the weight.

A speaker 620 may be coupled to a port on the UAV 600 and may enable the UAV 600 to emit sound. For example, the speaker 620 may be used as part of a distance measurement device (e.g., via sonar), to communication information to bystanders, and/or for other reasons. The speaker 620 may be controlled by the UAV 600 via a port using a data connection and power connection.

Other swappable components may also be coupled to the UAV 600, and may be powered by a power source of the UAV and/or may exchange data with a controller of the UAV 600.

Figure 7A:
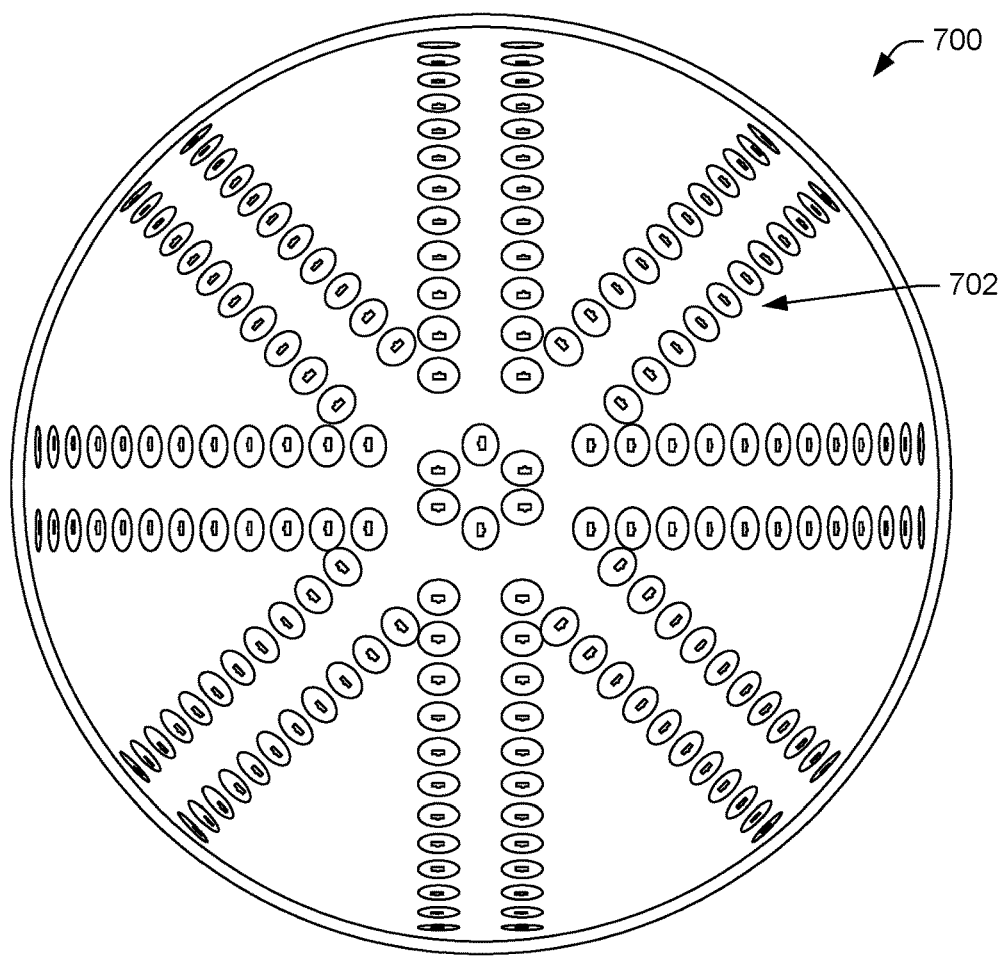
FIG. 7A shows a bottom plan view of a body of a UAV that includes a grid of ports enabling many placements of different swappable components.
Figure 7B:
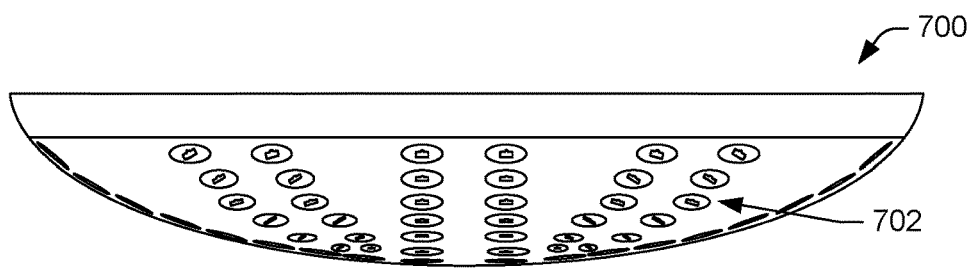
FIG. 7B shows a side elevation view of the body of the UAV that includes the grid of ports.

FIG. 7A shows a bottom view of a body 700 of a UAV that includes a grid of ports 702 enabling many placements of different swappable components. FIG. 7B shows a side elevation view of the body 700 of the UAV that includes the grid of ports 702.

As shown in FIG. 7A, an arrangement of the ports 702 may enable many different locations to couple various swappable components, such as the swappable components 602 shown in FIG. 6. By providing many ports, possibly more than a number of swappable components to be coupled to the ports, the body 700 of the UAV may provide extensive customization potential for customized placement of lights, imaging devices, speakers, robotic arms, and/or swappable components. Other grid designs may be used, which may enable coupling swappable components about the body of the UAV.

In some embodiments, some components may include multiple connectors that couple to multiple respective ports. For example, a component that draws a relatively large current may draw current from multiple ports to power the component. As another example, an intermediate logic board may have more connectors than ports, which may enable supplying additional current to the ports on the intermediate logic board, assuming that the ports on the UAV have power output constraints.

Figure 8:
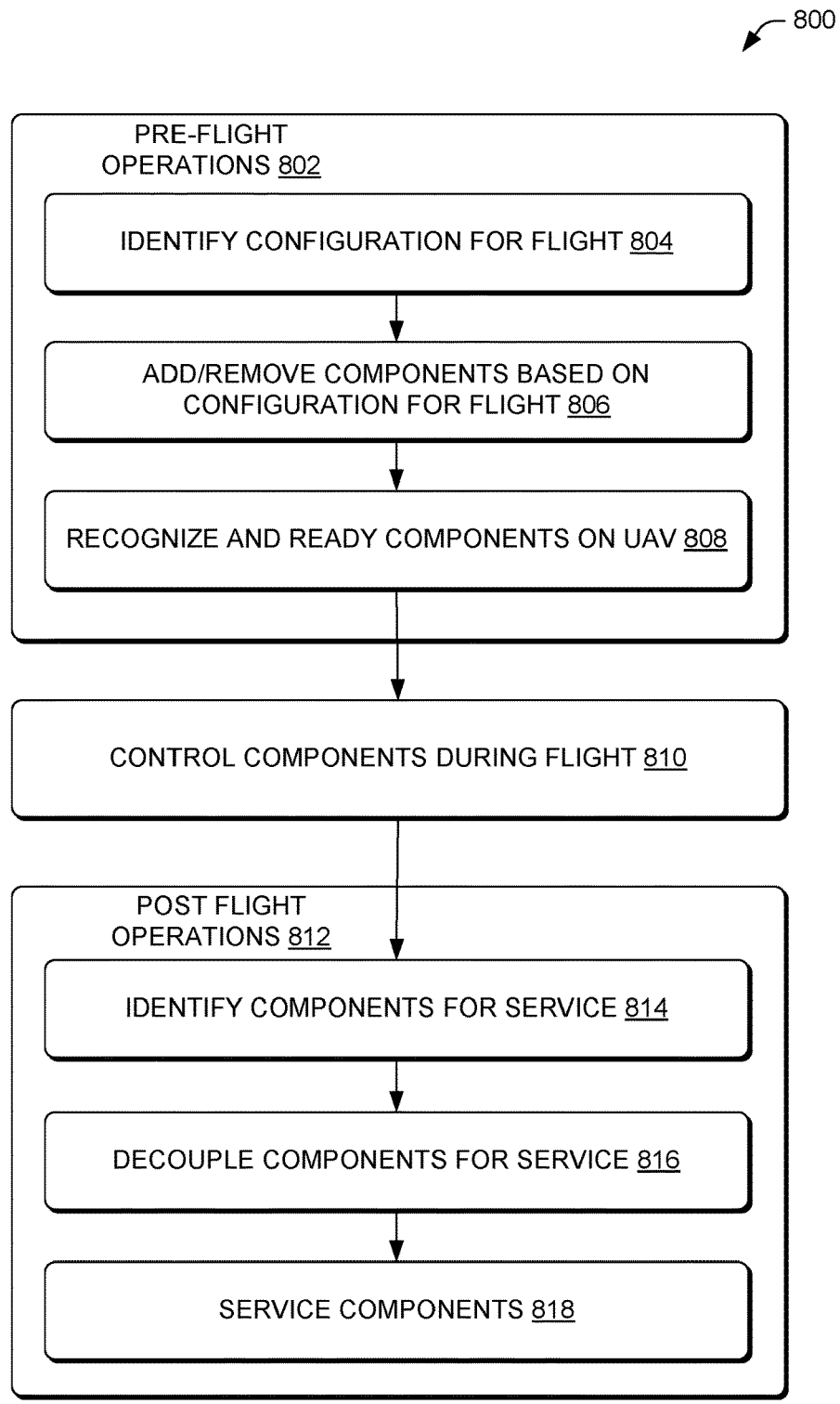
FIG. 8 is a flow diagram of an illustrative process to configure a UAV with swappable components.
Figure 9:
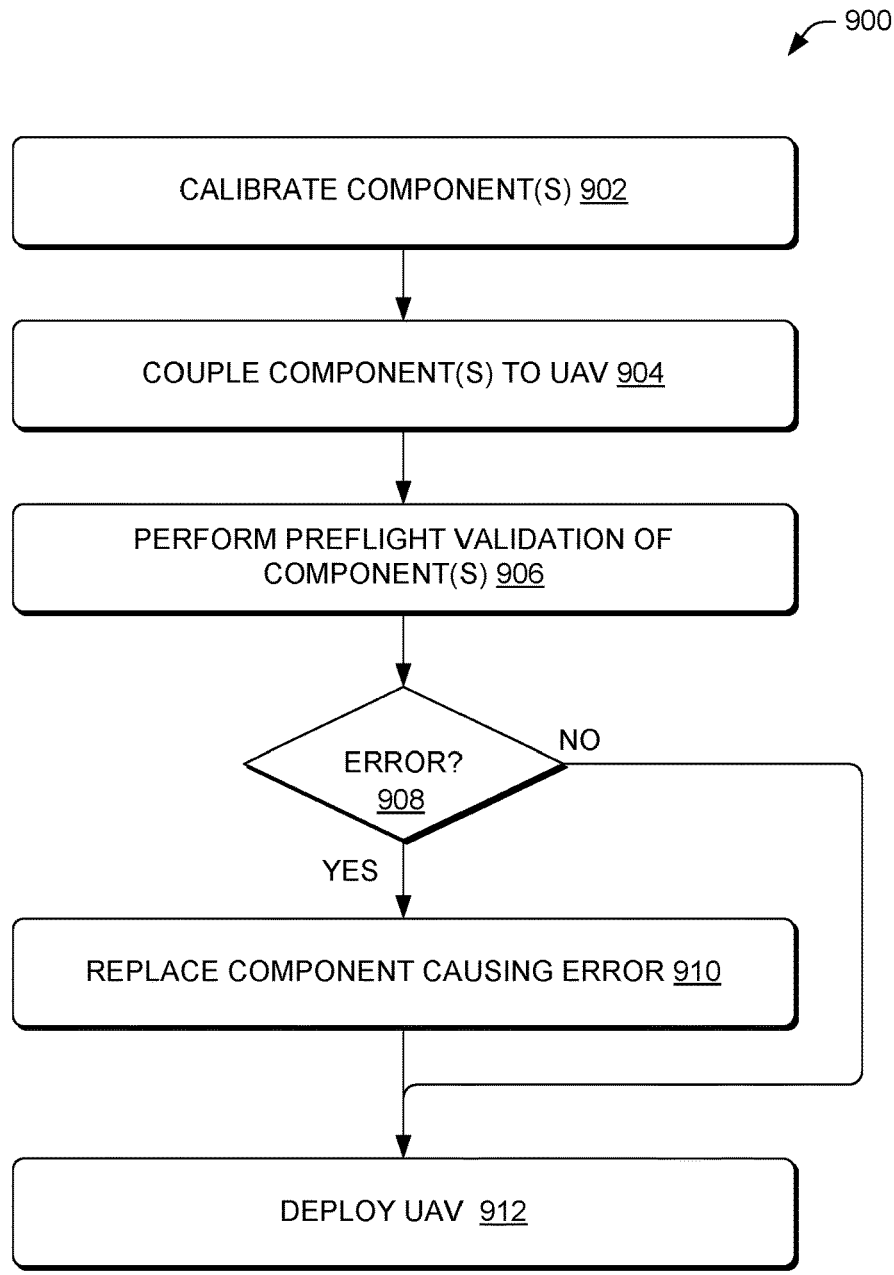
FIG. 9 is a flow diagram of another illustrative process to calibrate components for use by a UAV.
Figure 10:
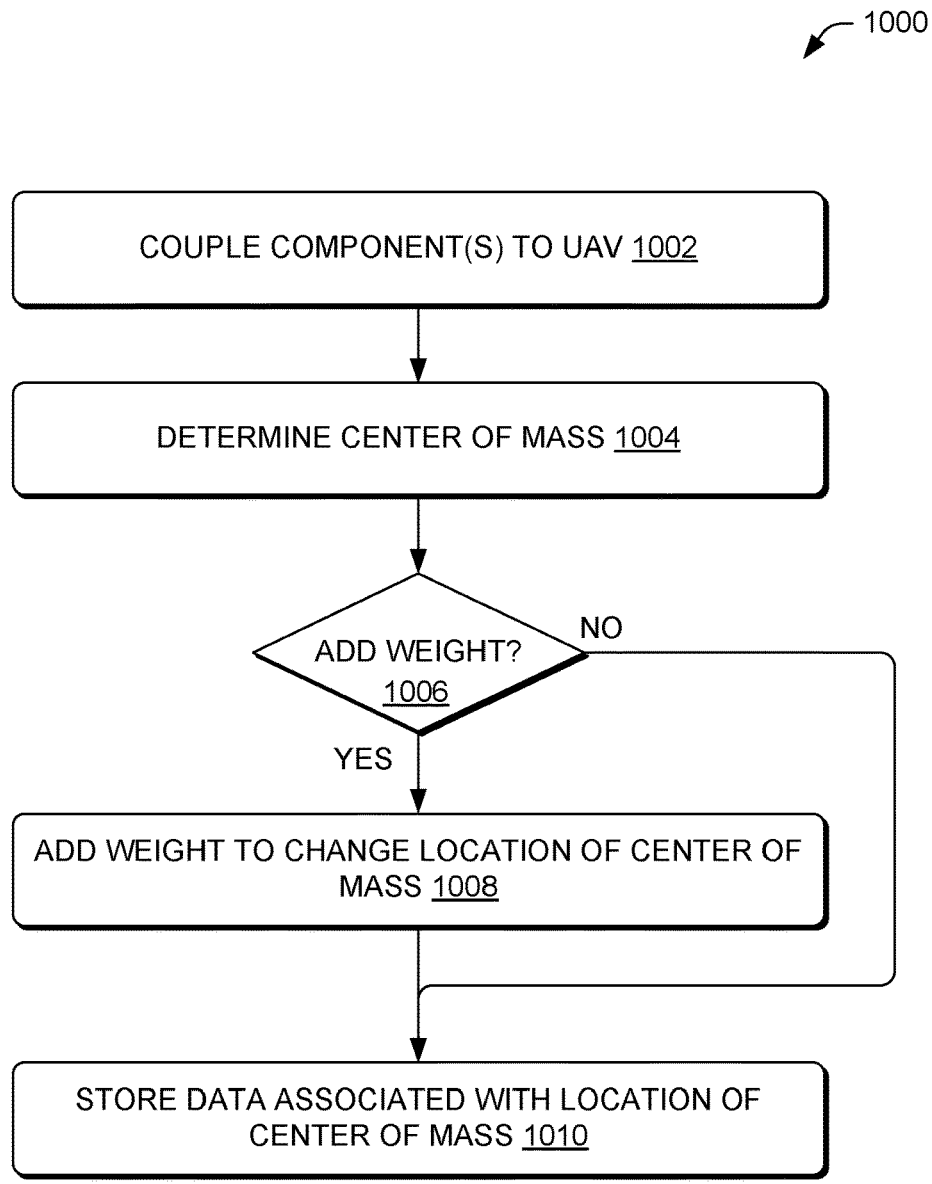
FIG. 10 is a flow diagram of an illustrative process to determine a center of mass of a UAV that includes swappable components.

FIGS. 8-10 show flow diagrams of illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 8 is a flow diagram of an illustrative process 800 to configure a UAV with swappable components. At 802, pre-flight operations may be performed to customize a UAV for a subsequent flight. The pre-flight operations may be performed based in part on a flight plan for the UAV, which may include delivery of one or more packages, collectively a payload. The flight plan may include a weight and size of the payload, a distance, and environmental factors such as weather, for example.

At 804, as part of the pre-flight operations, a configuration of the UAV may be determined based on the flight plan (as discussed above), based on user preferences, based on calibration data (e.g., a flight check, etc.), and/or based on other factors. The configuration of the UAV may determine which swappable components are to be added to the UAV prior to flight of the UAV. In some instances, some swappable components may be removed from the UAV prior to the flight, possibly to make room for other components, to reduce weight, or for other reasons.

At 806, swappable components may be added (coupled to) or removed (decoupled from) the UAV. For example a component may be selected for a specific port, such as to be facing in a certain position on the UAV and may be coupled to the port by inserting a connector of the component into a port. A different component may be removed from a different port, such as by activating a release mechanism to release or eject the component from the port.

At 808, the UAV sensor controller 224 may recognize a configuration of swappable components equipped on the UAV. The sensor controller 224 may recognize each component after coupling or may recognize all the components in a batch process, such as after the UAV is powered on or after another event or trigger. The sensor controller 224 may recognize a swappable component by providing power to the component and receiving a data response back from the component, possibly via a handshake protocol. The sensor controller 224 may then recognize the component and access a control set or instructions associated with the component to enable the sensor controller 224 to control or otherwise interact with the component. In some embodiments, when a component does not provide extensive data, such as a light or weight, the handshake protocol may be short and/or may not include loading a control set for the component.

At 810, the UAV may utilize the swappable components during flight. For example, the UAV may collect imagery from an image sensor and/or a distance device for navigation purposes during a flight. As another example, the UAV may operate a robotic arm to perform a specific function, such as to release a package at a destination during the flight.

At 812, following completion of the flight, post flight operation may be performed on the UAV and/or swappable components. For example, the post flight operations may be performed at a service center or at a point of receipt at a fulfillment center prior to redeployment of the UAV. The post flight operations may be performed within a matter of minutes to reduce or avoid downtime of the UAV.

At 814, sensor may be identified that are to be serviced. For example, the data collected from sensors may be analyzed to determine sensor that are malfunctioning. Some sensors may be identified based on a duration of use, such as a number of hours of use or a number of flights.

At 816, the swappable components may be decoupled from the UAV or ejected to enable service of the components at a later time without delaying redeployment of the UAV. For example, an operator may select the release mechanism corresponding to component identified or designated for service. In various embodiments, the UAV, via the sensor controller 224, may cause ejection of sensors from the UAV such as by activating the release mechanism to cause sensor to decouple from the UAV. For example, the sensor controller 224 may employ logic to determine malfunctioning sensors or sensors that have exceeded a threshold amount of use before an inspection or service.

At 818, the components removed or decoupled from the UAV may be serviced while the UAV is redeployed, possibly with replacement swappable components that replace components removed from the UAV.

FIG. 9 is a flow diagram of another illustrative process 900 to calibrate components for use by a UAV. At 902, a swappable component, such as a sensor, may be calibrated prior to coupling to a UAV and prior to a next use of the component. For example, the component may be a stereo camera pair, which may be calibrated to measure distance based on an alignment of the camera and/or other factors.

At 904, the swappable component may be selected for use by a UAV and coupled to the UAV. For example, the component may be selected to replace a malfunctioning component or to customize a UAV to perform a specific task.

At 906, a pre-flight validation of the component(s) may be performed. The pre-flight validation may validate calibrate and/or proper operation of different component to enable the component to operate with other components on the UAV, such as other swappable component on the UAV or component integrated in the UAV. The pre-flight validation may be performed as a flight-ready check regardless of whether new swappable components are added to the UAV.

At 908, the UAV or a controller may determine whether the pre-flight calibration detected an error in calibration or operation of a component. For example, the pre-flight check may verify proper operation of components as part of the validation or calibration. When components fail to operate properly, such as when a component's output is outside of a tolerance range, an error may be generated, which may trigger corrective action. When an error is detected (following the "yes" route from the decision operation 908), then the process 900 may advance to an operation 910.

At 910, a component associated with the error may be replaced (or swapped out) with another component. The replacement may be performed in seconds or minutes by ejecting or decoupling a first component, possibly using the release mechanism, and then coupling a replacement component to a same port that was previously used by the former component.

Following the operation 910, or when no error is detected (following the "no" route from the decision operation 908), then the process 900 may advance to an operation 912. At 912, the UAV may be deployed to perform a task using the swappable components coupled to the UAV. For example, the UAV may use the swappable components to assist in delivering a package to a delivery destination.

FIG. 10 is a flow diagram of an illustrative process 1000 to determine a center of mass of a UAV that includes swappable components.

At 1002, one or more swappable component(s) may be coupled to the UAV. For example, the component may be selected to replace a malfunctioning component or to customize a UAV to perform a specific task.

At 1004, a center of mass of the UAV may be determined for the UAV having the swappable components coupled to the UAV. The center of mass may be input to the vehicle controller 220 to enable proper balance, attitude, and control of the UAV during flight.

At 1006, a determination whether to couple one or more weights to available ports on the UAV may be made based on various factors, including the location of the center of mass. When the center of mass is substantially outside of a central axis of the UAV (e.g., axis extending vertically though the UAV when the UAV is in steady-state hover flight), then weights may be coupled to ports to cause the center of mass to be located closer to the central axis. By moving the center of mass closer to the central axis, the vehicle controller 220 may apply a more balanced operation of propulsion units and may not have to overcome "tilting" forces caused by a non-central location of the center of mass of the UAV. The weights may come in different sizes and amounts, which may be specified for use in certain configurations to properly balance or weight the UAV to modify the center of mass. Some factors considered in a determination of whether to add weight may include a deviation of the center of mass from the central axis, an ability for the UAV to transport additional weight, and an availability of a port to receive coupling of a weight, among other possible considerations. When a weight is determined to be added to the UAV (following the "yes" route at the decision operation 1006), then the process 1000 may advance to an operation 1008.

At 1008, the weight may be coupled to a specific port. In some embodiments, a specific weight and a specific location (e.g., port) may be identified in the determination of the center of mass operation 1004. Once coupled to the UAV, the weight may be identifiable by the UAV via a data connection of a port, which may enable the UAV (or another device) to identify an amount and location of the weight.

Following the operation 1008, or when no weight is determined to be added to the UAV (following the "no" route at the decision operation 1006), then the process 1000 may advance to an operation 1010. At 1010, the UAV may store data associated with the location of the center of mass. In some embodiments, the center of mass may be recalculated using a same process as used at the operation 1004. However, an additional determination of the center of mass may be performed using a different process, such as by calculating a change in a prior center of mass as a result of an addition of weight at a known location on the UAV. Thus, the data stored at the operation 1010 may be calculated without performing a same operation at performed at the operation 1004.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) comprising:
   an airframe;
   a battery coupled to the airframe;
   a logic board coupled to the airframe and connected to the battery, the logic board having a plurality of externally facing data ports to selectively receive a data connector of a swappable component;

a housing including couplers that selectively couple to the swappable component inserted into a data port of the data ports, the housing including apertures to provide access to the data ports;

a first swappable component configured to selectively couple to a first data port of the UAV; and a second swappable component configured to couple to a second data port or the first data port of the logic board, the second swappable component including an imaging device that is different than the first swappable component.

2. The UAV as recited in claim 1, wherein the logic board includes logic to:

identify the swappable component as the first swappable component or the second swappable component, and communicate with the swappable component based on a determined identifier of the swappable component.

3. The UAV as recited in claim 1, wherein the data ports are arranged around at least a perimeter of the housing of the UAV.

4. The UAV as recited in claim 1, wherein the first swappable component is at least one of a light, a communication component, a power source, or a speaker.

5. The UAV as recited in claim 1, wherein a data port is covered by a door that closes access to the data port when the swappable component is not coupled to the data port.

6. An unmanned aerial vehicle (UAV) comprising:

an airframe;

a logic board coupled to the airframe, the logic board having a plurality of externally facing ports to selectively receive a connector of a swappable component;

couplers that selectively couple to the swappable component inserted in the ports, the couplers to at least temporarily secure the swappable component to the UAV;

a first swappable component configured to selectively couple to a first port of the logic board; and a second swappable component configured to couple to a second port or the first port of the logic board, the second swappable component being different than the first swappable component.

7. The UAV as recited in claim 6, wherein the logic board includes logic to identify the swappable component as the first swappable component or the second swappable component.

8. The UAV as recited in claim 6, wherein the logic board, following identification of the swappable component as the first swappable component or the second swappable component, communicates with the swappable component based on a determined identifier of the swappable component.

9. The UAV as recited in claim 6, wherein the first swappable component is an image sensor and the second swappable component is at least one of a light, a communication component, a power source, or a speaker.

10. The UAV as recited in claim 6, wherein the first swappable component is at least one of a stereo camera, a time-of-flight sensor, a radar device, or an infrared camera.

11. The UAV as recited in claim 6, further comprising a controller to receive a center of mass of the UAV after coupling at least the first and second swappable component to the ports on the logic board.

12. The UAV as recited in claim 11, wherein the controller updates the center of mass in response to detection of another swappable component coupled to one of the ports.

13. The UAV as recited in claim 6, further comprising a release mechanism to enable decoupling the swappable component.

14. The UAV as recited in claim 6, wherein the port includes a directional feature to cause the swappable component to be coupled to the UAV in a known orientation.

15. The UAV as recited in claim 6, wherein the second swappable component is a robotic arm configured to selectively grasp an object and selectively release an object.

16. The UAV as recited in claim 6, wherein a port is covered by a hood coupled to the UAV by a hinge, the hood to cover at least the port when in a closed position.

17. The UAV as recited in claim 6, further including an intermediate logic board to interface between the port and the first and second swappable components, the intermediate logic board being configured to couple the first and second swappable components to a single port.

* * * * *